(12) United States Patent
Hicks

(10) Patent No.: US 12,408,787 B2
(45) Date of Patent: Sep. 9, 2025

(54) SYSTEMS, METHODS, AND DEVICES FOR ELECTRONIC DYNAMIC AWARD ASSEMBLY

(71) Applicant: Eric A. Hicks, Springfield Gardens, NY (US)

(72) Inventor: Eric A. Hicks, Springfield Gardens, NY (US)

( * ) Notice: Subject to any disclaimer, the term of this patent is extended or adjusted under 35 U.S.C. 154(b) by 534 days.

(21) Appl. No.: 17/819,090

(22) Filed: Aug. 11, 2022

(65) Prior Publication Data

US 2023/0048449 A1 Feb. 16, 2023

Related U.S. Application Data

(60) Provisional application No. 63/260,157, filed on Aug. 11, 2021.

(51) Int. Cl.
| | |
|---|---|
| G09F 23/00 | (2006.01) |
| A47G 33/00 | (2006.01) |
| G06Q 20/36 | (2012.01) |
| G06Q 20/38 | (2012.01) |
| G09F 19/18 | (2006.01) |

(52) U.S. Cl.
CPC .......... *A47G 33/004* (2013.01); *G06Q 20/36* (2013.01); *G06Q 20/3829* (2013.01); *G09F 19/18* (2013.01); *G09F 23/00* (2013.01); *G06Q 2220/00* (2013.01)

(58) Field of Classification Search
CPC .. A47G 33/004; G06Q 20/36; G06Q 20/3829; G06Q 2220/00; G09F 23/00; G09F 19/18; G09F 27/005

USPC .......................................................... 463/1
See application file for complete search history.

(56) References Cited

U.S. PATENT DOCUMENTS

| | | | | |
|---|---|---|---|---|
| 2007/0025686 | A1* | 2/2007 | Shorthouse | H04N 5/85 386/E5.064 |
| 2007/0124972 | A1* | 6/2007 | Ratcliffe | G09F 21/04 40/591 |
| 2008/0176655 | A1* | 7/2008 | James | G16H 20/60 600/301 |
| 2012/0229440 | A1* | 9/2012 | Rao | G06Q 20/3574 345/211 |
| 2013/0297683 | A1* | 11/2013 | Jayanthi | G07F 7/1008 709/219 |
| 2016/0292745 | A1* | 10/2016 | Jayanthi | G06Q 50/20 |

(Continued)

FOREIGN PATENT DOCUMENTS

BR 202016030471 U2 * 7/2018

OTHER PUBLICATIONS

U.S. Appl. No. 63/181,872, filed Apr. 29, 2021 (Year: 2021).*

*Primary Examiner* — Michael A Cuff
(74) *Attorney, Agent, or Firm* — Knobbe, Martens, Olson & Bear, LLP

(57) ABSTRACT

This disclosure relates to awards. In some embodiments, an award can include a base having a front surface and a display assembly comprising a display apparatus, a non-transitory computer-readable medium with instructions encoded thereon, and one or more processors configured to execute the instructions to cause the display assembly to display, to a recipient of the award, information relating to an event for which the recipient received the award. In some embodiments, an award can include a communications interface to enable content to be provided to the award.

19 Claims, 7 Drawing Sheets

(56) References Cited

U.S. PATENT DOCUMENTS

| | | | |
|---|---|---|---|
| 2020/0042998 A1* | 2/2020 | Mendhi | G06Q 20/0658 |
| 2020/0184547 A1* | 6/2020 | Andon | G06Q 30/0209 |
| 2022/0033166 A1* | 2/2022 | Pellegrino | B65B 5/04 |
| 2022/0188841 A1* | 6/2022 | Krassner | G06Q 30/0253 |
| 2022/0189256 A1* | 6/2022 | Shaya | G07F 17/323 |
| 2022/0398572 A1* | 12/2022 | Lee | G06Q 20/389 |
| 2024/0033647 A1* | 2/2024 | Shaya | A63F 13/798 |
| 2025/0061273 A1* | 2/2025 | Roy | G06F 40/186 |

* cited by examiner

SYSTEMS, METHODS, AND DEVICES FOR ELECTRONIC DYNAMIC AWARD ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority under 35 U.S.C. § 119(e) to U.S. Provisional Application No. 63/260,157, filed Aug. 11, 2021, and the entirety of this application is incorporated by reference herein for all purposes.

BACKGROUND

Field

This disclosure generally relates to electronic award assemblies, and more particularly to systems, methods, and device for electronic dynamic award assemblies.

Description

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Participants in sports and other competition often receive trophies to commemorate participation or a particular achievement. However, conventional trophies lack interactivity and can fail to hold the interest of the recipient. Often, trophies are placed on a shelf, in a display case, and so forth, and are largely forgotten about before eventually being placed into storage or discarded. Additionally, sports leagues, sports teams, and so forth can often struggle to secure sufficient funding to provide trophies to participants.

SUMMARY

The systems, methods, and devices described herein each have several aspects, no single one of which is solely responsible for its desirable attributes. Without limiting the scope of this disclosure, several non-limiting features will now be described briefly.

In some aspects, the techniques described herein relate to an award including: a base having a front surface; and a display assembly including: a display apparatus; a non-transitory computer-readable medium with instructions encoded thereon; and one or more processors configured to execute the instructions to cause the display assembly to display, to a recipient of the award, information relating to an event for which the recipient received the award.

In some aspects, the techniques described herein relate to an award, wherein the award is a trophy.

In some aspects, the techniques described herein relate to an award, wherein the award is a plaque.

In some aspects, the techniques described herein relate to an award, wherein the display apparatus includes a flat panel display.

In some aspects, the techniques described herein relate to an award, wherein the display apparatus includes a projector.

In some aspects, the techniques described herein relate to an award, further including an audio processor and a speaker.

In some aspects, the techniques described herein relate to an award, further including a communications interface.

In some aspects, the techniques described herein relate to an award, wherein the communications interface is one or more of a Bluetooth interface, a Wi-Fi interface, a wired network interface, a USB interface, and an infrared interface.

In some aspects, the techniques described herein relate to an award, wherein the instructions, when executed by the one or more processors, further cause the award to: receive, a from central server via the communications interface, media content; display, via the display apparatus, media content to the recipient.

In some aspects, the techniques described herein relate to an award, wherein the instructions, when executed by the one or more processors, further cause the award to: transmit, to a central server via the communications interface, a unique identifier of the award; receive, from a central server based at least in part on the unique identifier, an advertisement; and display, via the display apparatus, the advertisement.

In some aspects, the techniques described herein relate to an award, wherein the instructions, when executed by the one or more processors, further cause the award to: receive, from a central server via the communications interface, a reminder of an upcoming date, wherein the upcoming date is one or more of a reunion date, an anniversary date, a reservation date, a practice date, a game date, a season start date, and a signup date.

In some aspects, the techniques described herein relate to an award, wherein the instructions, when executed by the one or more processors, further cause the award to: transmit, to a server via the communications interface, an identifier of the recipient of the award; receive, from the server, information indicative of digital currency; and store, in a digital wallet, the information indicative of the digital currency.

In some aspects, the techniques described herein relate to an award, wherein the digital currency is a cryptocurrency.

In some aspects, the techniques described herein relate to an award, wherein the instructions further cause the award to: transmit, to the server, a public key associated with a digital wallet, wherein the received information indicative of digital currency is encrypted by the server using the public key.

In some aspects, the techniques described herein relate to an award, wherein the award is configured to receive, via the communications interface from a computing device of the recipient, media content, wherein the media content is one or more of audio, video, and photos, and wherein the computing device of the recipient is one or more of a desktop computer, laptop computer, and smartphone.

In some aspects, the techniques described herein relate to a method for providing data to an award, the method including: receiving, from one or more sources, content associated with one or more awards; receiving a unique identifier associated with the award; determining, based on the unique identifier, a first subset of the received content that is associated with the award; determining, based at least in part on the unique identifier, to transmit a second subset of the received content associated with the award; and transmitting the second subset to the award.

In some aspects, the techniques described herein relate to a method, wherein transmitting the second subset to the award includes transmitting the second subset to a computing device associated with a recipient of the award.

In some aspects, the techniques described herein relate to a method, wherein the second subset includes an advertisement.

In some aspects, the techniques described herein relate to a method, wherein determining to transmit the second subset includes determining that the second subset has not been sent to the award.

In some aspects, the techniques described herein relate to a method, wherein the second subset includes an advertisement, and wherein determining to transmit the second subset includes determining that a recipient of the award is in a target group for the advertisement.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings.

DETAILED DESCRIPTION

Figure 1:
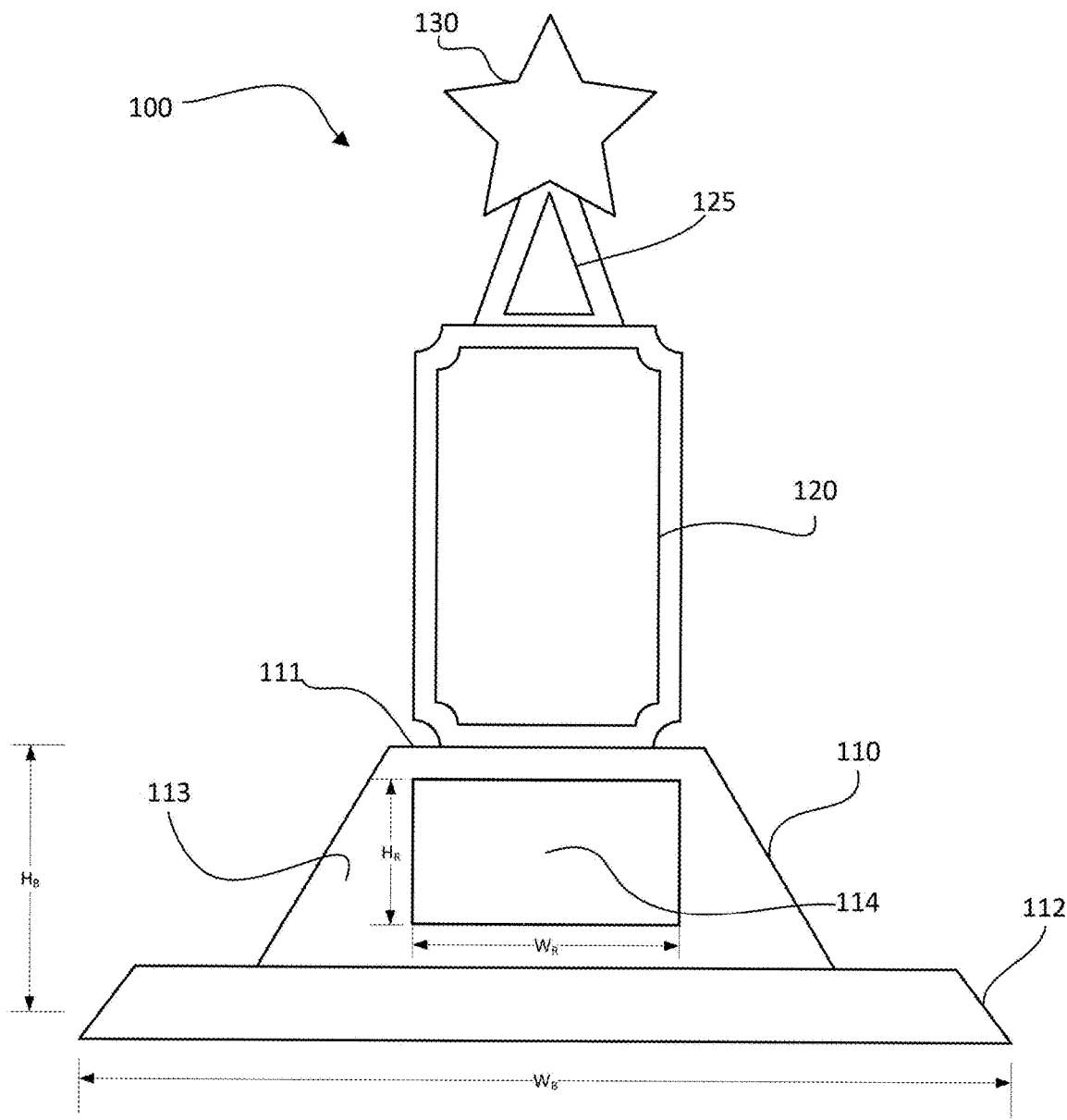
FIG. 1 illustrates an example of a trophy according to some embodiments.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Since ancient times, trophies have been used to mark victories in a particular activity or competition. In ancient Greece, trophies were used to reflect victory in war, and they were created on the battlefield at the place where the enemy had been defeated. Of course, the methods of manufacturing trophies have far advanced from the times of ancient Greece, and as technology continues to develop, trophies have the ability to become technologically advanced as well.

It has long been a tradition to hand out trophies, plaques, and other prizes and mementos to participants and/or winning teams in youth sports leagues. Specifically, trophies are handed out to each participant, with the players on the winning team getting larger trophies than the other participants. Furthermore, individual teams tend to award individual players on the team with plaques or trophies to commemorate a special achievement, such as most home runs, most valuable player, most spirited, and the like. However, as children continue to play in youth sports leagues, they often simply collect the trophies and place them on the mantle or in storage.

It is commonplace for parents and coaches to video tape players while they are competing in athletic activities. Coaches may video tape a game in order to assess how the players performed. Parents may video tape a game in order to save the memories and capture that game-winning goal scored by their child. However, just as trophies are often stored away after being received, videos of the child participating in the athletic activity are also often simply stored away and rarely ever watched.

Technology has come a long way since trophies started being awarded in youth sports leagues. The internet, for example, has blossomed to the point where people can easily communicate and send data through various networks without ever coming face to face with one another. People stay in touch with friends from the past via social networking sites, and couples begin their relationships by meeting through internet dating services. Companies advertise, offer coupons, and sell goods and services through the internet without ever creating any paper.

While technology has advanced, trophies have largely stayed the same. Modern technology can be used to provide a trophy that can display video of the trophy recipient participating in the athletic activity for which participation in gave rise to the awarding of the trophy. Such a trophy can offer a wide range for functionality. For example, the trophy can have a video display, memory, and a processor such that a database or server can send data to the trophy in order to make the trophy recipient aware of special events and opportunities, promotional offers, and so forth.

While the foregoing and the following descriptions relate primarily to trophies and awards given for participation in sporting activities and events, the systems, methods, and devices described herein can be used in a variety of other circumstances as well. For example, trophies and other awards consistent with this disclosure may be given out for spelling bees, mathematics competitions, debate competitions, e-sports competitions, gambling competitions (e.g., poker competitions), science fairs, and so forth.

In some embodiments, the smart award systems disclosed herein comprise an award assembly, for example, a trophy apparatus, for example, a plastic, wood, resin, and/or metal figure, cup, column, and/or other emblem. In some embodiments, the systems disclosed herein comprise a video display assembly integrated into and/or connected to the trophy apparatus. In some embodiments, a video display assembly can include a display apparatus (e.g., an LCD panel, an OLED panel, a projector, etc.), one or more processors, and non-volatile memory for storing content and/or instructions for providing content, communicating with external devices, and so forth. In some embodiments, the systems disclosed herein comprise a video system configured to display content to a user. In some embodiments, the smart award systems disclosed herein comprise an audio system. In some embodiments, the audio system can be integrated into the trophy apparatus and/or connected to the trophy apparatus. In some embodiments, the smart award systems disclosed herein comprise an audio system configured to output content to a user. In some embodiments, the audio system can comprise an audio processor and/or one or more speakers. In some embodiments, the smart award systems disclosed herein comprise an antenna system configured to wirelessly connect to a network. In some embodiments, the smart award systems disclosed herein comprise an antenna system configured to wirelessly connect to a central server. In some embodiments, the systems disclosed herein comprise a Bluetooth adapter or NFC or other communications interface or adapter for electronic communication with a desktop computer, laptop computer, smartphone, or other computing device of a user. In some embodiments, the systems disclosed herein are configured to communicate with a central server via the network connection of the user's computing device. In some embodiments, the systems disclosed herein are configured and/or changed and/or updated via a smartphone device via an electronic communications network channel. In some embodiments, the smart award systems disclosed herein comprise a network adapter configured to communicate with a central server via an electronic network in order to receive and/or access content from the central server for output to a user through the video display assembly and/or the audio system. In some embodiments, the smart award systems disclosed herein comprise a central processing unit in electronic communication with an electronic storage medium, such that the central processing unit and the electronic memory are configured to process data received and/or accessed from the central server in order to output content to the user via the video display assembly and/or the audio system.

In some embodiments, the systems disclosed herein can be configured to connect to a central server via a wireless connection, for example, Wi-Fi, Bluetooth, cellular, or the like. In some embodiments, the system is configured to function as a content hub, content portal, exclusive content generator, content bank, exclusive content distribution hub, and/or a sports content ticker, wherein the central server is configured to electronically transmit the content data from the central server to the smart award system. In some embodiments, the system is configured to receive or access exclusive applications and/or content from the central server for display to the user via a display system that is part of or connected to the smart award system. In some embodiments, the original content can comprise original video and/or song releases; exclusive sponsor and/or advertiser related materials, for example, game, show, movie, and/or other entertainment tickets and/or passes, sponsor data, and/or advertiser data related exclusive coupons, discounts, and/or other such offers of goods and/or services. In some embodiments, the system is configured to be more than just an end-result trophy award assembly but rather can act as an opening to an exclusive network of opportunities to be monetized through sponsors and/or advertisers.

In some embodiments, the system can be configured to store digital currency in a digital wallet. The system can include a cryptocurrency wallet. For example, the system can be configured to collect, house, and/or store deposits made by various sponsors that can be cashed out and/or used to purchase sponsor goods and services. In some embodiments, the system is configured to provide cryptocurrency wallet functionality for storing NFTs (non-fungible tokens) linked to unique digital assets, for example, unique content owned by or licensed to the user. In some embodiments, the digital wallet (which may be a cryptocurrency wallet) may be encrypted. For example, the digital wallet may use public key cryptography, and the system may provide the public key that a server can use for encrypted digital currency and other digital assets, which may be decrypted by the recipient using an associated private key.

In some embodiments, the system is configured to synchronize with other smart award systems to create a light show/display, for a synchronized light show among a plurality of smart award systems. In some embodiments, the more smart award systems that collected by a user, the greater the interconnectivity and/or ability to create more complex displays and/or light shows among a plurality of smart award systems.

In some embodiments, the system is configured to cast content to media players, smart televisions, and/or other connected devices. In some embodiments, the system is configured to act as a hub to receive content and transmit the content to other connected devices for viewing and/or listening.

In some embodiments, the system is configured to comprise a projector that enables the projection of content onto a wall, screen or the like. In some embodiments, the system is configured to comprise a flat panel display, such as an LCD panel, LED panel, OLED panel, quantum dot LED panel, plasma panel, e-ink panel, or the like. Unless context clearly requires otherwise, "display screen," "screen," and similar terms include without limitation any suitable projector or flat panel display technology.

In some embodiments, the system is configured to collect data of the user for more efficient target marketing by sponsor partners or advertisers. In some embodiments, the system is configured to grow with the user, becoming a more personal provider of content.

In some embodiments, the system is configured to be a marketing media source for sponsors and advertisers. In some embodiments, the system is configured to provide sponsors and/or advertisers with a target market for goods and services.

In some embodiments, the system is configured to be upgradeable with respect to certain attributes. In some embodiments, the system is configured to be able to "add points" (or value) to the system by how the user interacts with the system, for example, making purchases from exclusive sponsors and/or advertisers and/or inputting codes to validate their purchases. In some embodiments, the system is configured to such that the point values accumulate (for example, going up a level), certain attributes will unlock and/or be transmitted to the system (or systems if the user has more than one system) from the central server to create new attributes, for example, color changes, display changes, content changes, or the like, and/or receive new exclusive offers, additional privileges, and/or the like.

In some embodiments, the system is configured to enable sponsorship opportunities. For example, the system can be configured to be tied in with a bank sponsorship that offers money to be applied to higher education tuition upon submitting a first tuition bill, that provides rewards for attending classes, and so forth. In some embodiments, the system is configured such that bank sponsors can create relationships with new customers, develop loyalty relationships with recipients, and/or enable customers with greater knowledge about the services the bank provides. In some embodiments, the system is configured to be pre-loaded with a monetary amount as an incentive and/or an amount that the sponsor will match with a deposit at their institution. In some embodiments, other financial and/or investment institutions may sponsor trophies. For example, an investment company could provide incentives for recipients to use its services for investments. It will be understood that similar approaches can be used by other industries outside of financial services.

As illustrated above, the systems and methods described herein can provide a wide range of functionality and can enable new and/or improved sponsorship, advertising, and/or marketing opportunities.

FIG. 1 illustrates an example of a trophy 100 according to some embodiments. The trophy 100 can include a base 110, a column 120, a riser 125, and a figurine 130. The column 120, riser 125, and figurine 130 portions of the trophy 100 are typical of trophies that are awarded to participants in a sporting league as a reward for participation or for achievement of an exceptional feat. In the exemplary embodiment, the figurine 130 is illustrated as a generic star. However, the figurine 130 could be a basketball player, baseball player, golfer, skier, ice skater, hockey player, soccer player, football player, and so forth. The figurine 130 can be any symbolic identifier desired depending on the activity giving rise to the awarding of the trophy 100.

The column 120 is a feature of the trophy 100 that gives the trophy 100 an additional amount of size and height. Recipients of trophies, particularly children, tend to get more enjoyment out of a larger trophy than a smaller trophy. Thus, the column 120 provides this enhancement of the size. The riser 125 is illustrated as being roughly triangular or trapezoidal and placed between the column 120 and the figurine 130. However, the riser 125 may take on any other shape as would be known to one of skill the art, for example ovular, spherical, and so forth. The riser 125 may be omitted in some embodiments. The riser 125 may be used to imprint a logo or company name, to indicate a recipient's position (e.g., first place, second place, or third place), and so forth.

The column 120, riser 125, and figurine 130 are preferably formed of a metal material such as, for example, brass, bronze, copper, aluminum, steel, or the like. Alternatively, the column 120, the riser 125, and the figurine 130 can be made of a plastic material that is colored to resemble gold, silver, platinum, bronze, or any other desired color. The figurine 130 may receive a metallized finish which can involve washing the figurine 130 with a topcoat, heating a metal foil, and pressing the metal foil onto the figurine 130. Furthermore, any of the components may alternatively be formed of wood or another material or may be formed from a combination of different materials. Thus, the materials of each of the column 120, the riser 125, and the figurine 130 may be selected to create a unique trophy with desired characteristics. It will be understood that the size, including the lengths and width of the column 120, the riser 125, and the figurine 130 can be configured as desired and the present disclosure is not limited to any particular size or geometry. In some embodiments, a trophy may have more, fewer, and/or different structures than shown in FIG. 1. For example, a trophy could have additional columns or no column, may not have a riser, or other features may be added to or removed from the trophy.

In some embodiments, the column 120, the riser 125, and the figurine 130 are formed of a plastic material. In such embodiments, the components can be injection molded, extruded, 3D printed, and so forth. The column 120, riser 125, and figurine 130 can be injection molded in a single step or in multiple steps. If in multiple steps, the column 120, riser 125, and figurine 130 can be later assembled in any manner as would be known to persons skilled in the art, such as welding, screwing, adhesion, or the like.

In some embodiments, the base 110, column 120, riser 125, and figurine 130 can be formed of a resin. The riser 125 and figurine 130 can also include internal metal wiring for support and stability of the figurine 130. The base 110, column 120, riser 125, and figurine 130 can be of any color, can be of multiple colors, and/or can be of different colors from each other. Thus, in certain embodiments the base 110 and column 120 can be, for example, colored to reflect team colors. As just one example, a base 110 and column 120 could be colored royal blue with orange streaks to represent the colors of a particular sports team.

Figure 2:
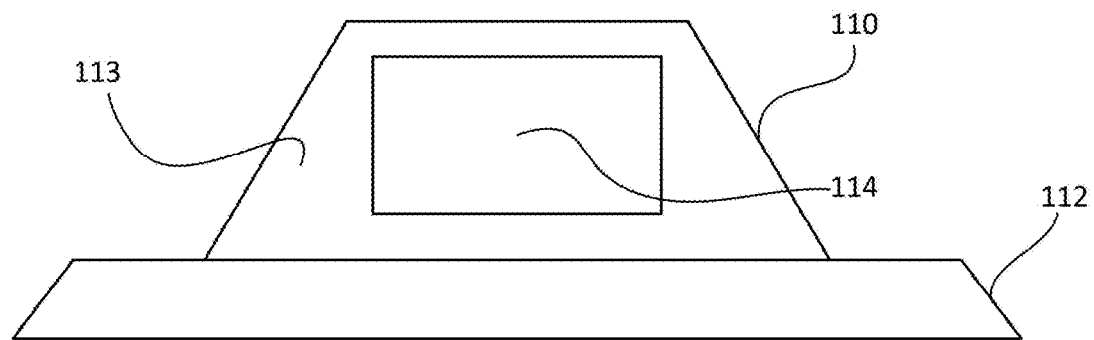
FIG. 2 illustrates an example of a portion of trophy according to some embodiments.

With reference to FIG. 1 and FIG. 2, the base 110 will now be described in greater detail. In some embodiments, the base 110 is formed of a plastic material that is made to look like marble or wood. In some embodiments, the base 110 may be formed of marble, wood, or another material. The base has a top surface 111 and a bottom surface 112. Both the top surface 111 and the bottom surface 112 are flat surfaces (e.g., substantially flat). Specifically, the bottom surface 112 can be a flat surface so that the bottom surface 112 can be positioned atop another flat surface, such as a table or shelf, while remaining upright. The top surface 111 can be a flat surface so as to act as a sturdy platform that the column 120 can be affixed or attached to. The top surface 111 is not limited to a flat surface and can take on other configurations so long as it is configured to facilitate attachment of the column 120 to the top surface 111 of the base 110. The base 110 can serve purposes beyond mere ornamental features of the trophy 100, as will be described in more detail below. In some embodiments, ornamental features of the trophy, which can include the column 120, the riser 125, and the figurine 130, can be attached to the base 110 to form one integral structure. The column 120, the riser 125, and the figurine 130 can be attached to the base 110 in any manner known to persons skilled in the art, including adhesion such as glue or tape, welding, snaps, straps, screws, hook-and-loop fasteners, and so forth.

The base 110 can comprise a front surface 113. The front surface 113 can be configured for attachment of a display apparatus 150 of a video display assembly that will be described in more detail below. The particular size and shape of the base 110 should not be construed as limited the present disclosure unless specifically recited in the claims. The front surface 113 of the base can include a recess 114 that is sized and shaped to fit a display screen therein. The front surface 113 is preferably from about 0.1 to about 1.5 inches deep, for example from about 0.2 to 0.3 inches deep, for example 0.25 inches deep. The depth of the recess 114 can be greater or smaller as desired for accommodating a thicker or thinner display screen. The base 110 can be configured to accommodate additional electronics, such as processors, memory, power supply electronics, and so forth of the video display assembly. In some embodiments, the additional electronics can be built into a display apparatus (e.g., a flat panel screen) as a single cohesive unit that can be installed in the recess of the base 110. In some embodiments, components can be separate and there may be, for example, a cavity or cutout in the base for housing additional electronic components.

Figure 3:
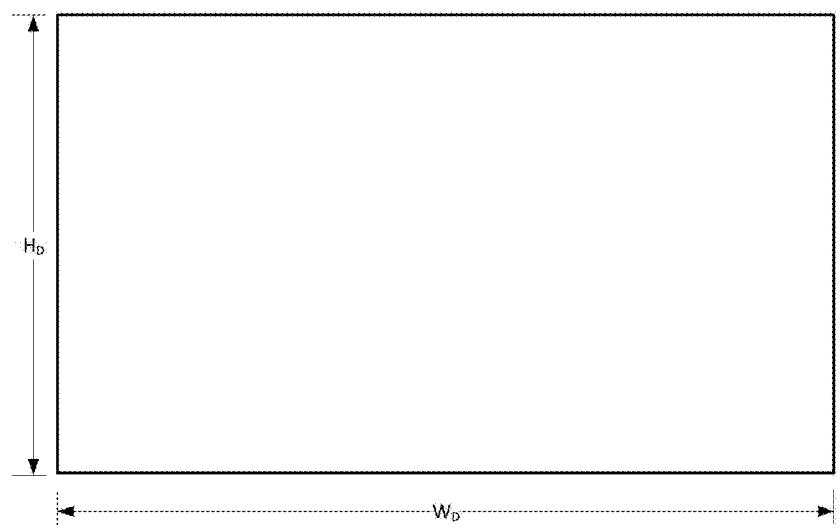
FIG. 3 illustrates an example embodiment of a display.

FIG. 3 is an example illustration of an embodiment of a display apparatus 150. As can be seen, the display apparatus 150 can have a width $W_D$ and a height $H_D$. In some embodiments, the width $W_D$ can be, for example, from about 1 inch to about 6 inches, for example 4.25 inches, or larger or smaller if desired. The height $H_D$ can be, for example, from about 1 inch to about 5 inches, for example about 2.75 inches. Generally, the display apparatus 150 can be of any desired size and shape so long as it can be fitted within the recess 114 of the front surface 113 of the base 110. For example, the width $W_D$ can generally be less than or equal to the width $W_B$ of the base 110 and the height $H_D$ can generally be less than or equal to the height $H_B$ of the base.

Figure 4:
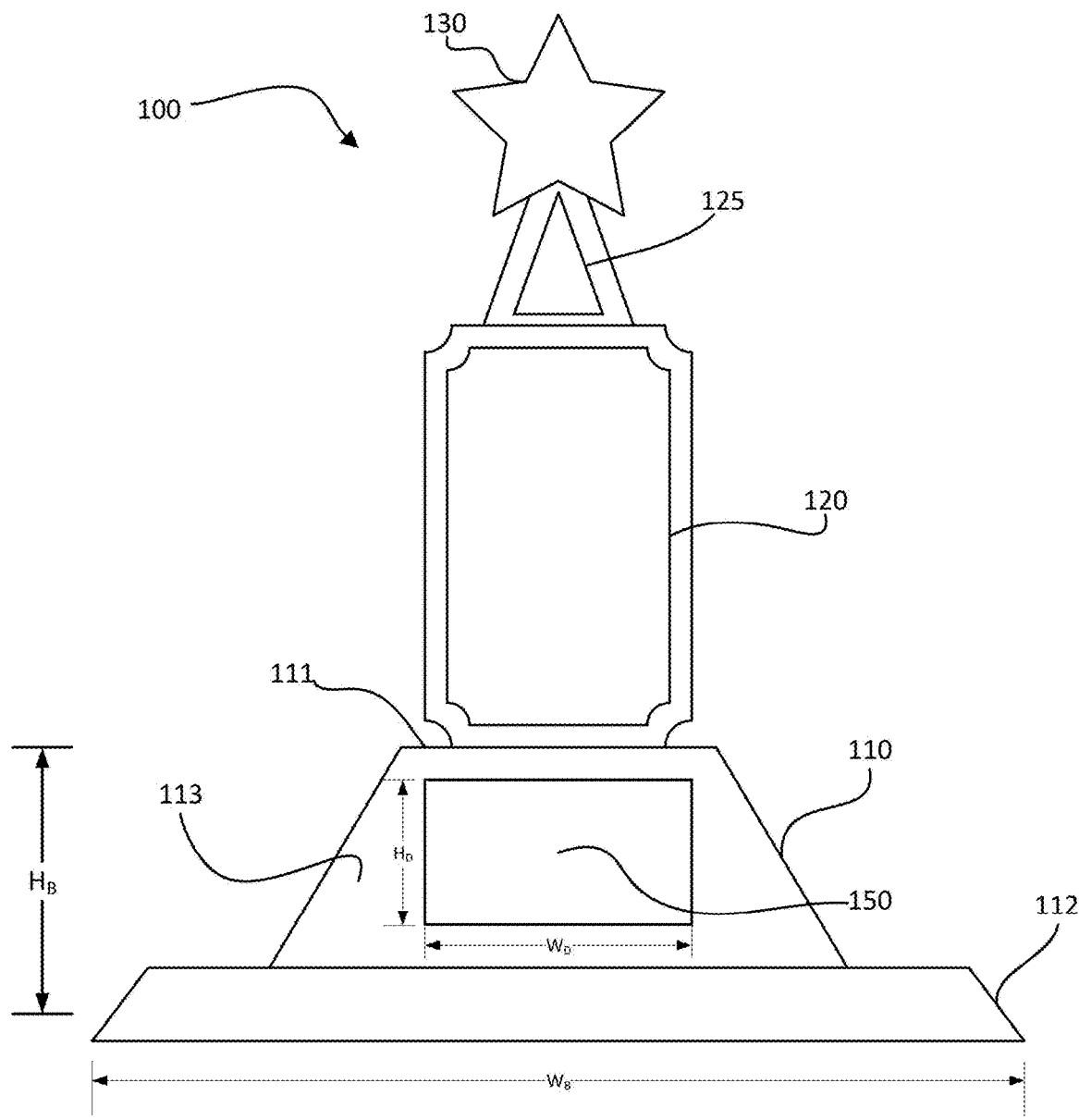
FIG. 4 illustrates an example of a trophy comprising a display according to some embodiments.

As shown in FIG. 4, the display apparatus 150 can be attached to the base 110. The display apparatus 150 can be attached to the base 110 in any manner known to persons skilled in the art. For example, the display apparatus 150 can be attached to the base 110 by adhesion, hook-and-loop fasteners, straps, snap fitting, friction fitting, interference fitting, screwing, and so forth. The display apparatus 150 can be positioned within the recess 114 so that the display apparatus 150 is flush with the front surface 113 of the base 110, although the display apparatus 150 could alternatively be recessed or could protrude outward from the front surface 113 of the base 110. In some embodiments, the display apparatus 150 can be affixed to a piece of material that matches the material of the base 110. The piece of material with the display apparatus 150 affixed thereto can be positioned within the recess 114.

In some embodiments, the display apparatus 150 can display video, still photos, text, and so forth. Although the trophy 100 is described as having a display apparatus 150, the display apparatus 150 may include features beyond simply displaying content. For example, the display apparatus 150 can include associated hardware and software for playing video, playing audio, and so forth. In some embodiments, the display apparatus 150 can be part of a display system that can include a processor, such as a central processing unit (CPU) that is able to process data and content. In some embodiments, the display assembly may be configured with hardware and/or software to enable communications with other computers to download content manually and/or automatically via the Internet, over a local network connection, and so forth. In some embodiments, the display screen assembly can include a video player and/or audio player and can be connectable to the Internet or another network either wirelessly or through a wired connection. Thus, rather than simply being an end product that displays pre-loaded content that has been loaded to the display apparatus 150, the trophy 100 can be capable of ongoing upgrades and/or updates and can download new content or other updates over time. Thus, the potential uses of the trophy 100 can change and expand as technology evolves.

In some embodiments, the trophy 100 includes adaptable technology that enables uploaded and updating of content in various formats, including, for example, photographs, audio, and video media. In some embodiments, images and other data can be transferred to the display apparatus 150 via a USB port, WiFi connection, ethernet connection, Bluetooth connection, infrared connection, and so forth. In some embodiments, the display apparatus 150 can include cellular hardware such that the display apparatus 150 can download content over a cellular connection, for example of 3G, 4G, or 5G connection. The wired ports and/or wireless capabilities of the display assembly can enable the trophy 100, and more specifically the display assembly, to be connected to other computers, for example to another computer on a local network and/or on the internet. In some embodiments, video can be transferred directly to the display apparatus 150 via USB, Wi-Fi, Bluetooth, etc., and can be stored in memory of the display assembly for playback later on the display apparatus 150 as desired by the user. For example, the trophy 100 can be configured with a button, switch, etc., such as a play button or an on/off button, such that upon depressing the button (or, for example, actuating the switch), the video content, images, audio, and so forth saved in the memory can be displayed on the display apparatus 150. In some embodiments, the video, audio, and/or images stored in the memory can be played continuously, for example in a random pattern or on a loop. In some embodiments, a single video, audio clip, image, etc., may be shown on a loop. In some embodiments, different videos, audio clips, images, etc., may be shown at different times. For example, a different media item may be played each time the user presses a button and/or the trophy 100 may randomly or sequentially play the various media files contained in the memory. In some embodiments, the user may provide input via hardware buttons. In some embodiments, the user may provide input via the display apparatus 150. For example, the display apparatus 150 may be a touchscreen that may show virtual buttons for playing content, skipping content, or otherwise interacting with content display on the display apparatus 150.

Figure 5:
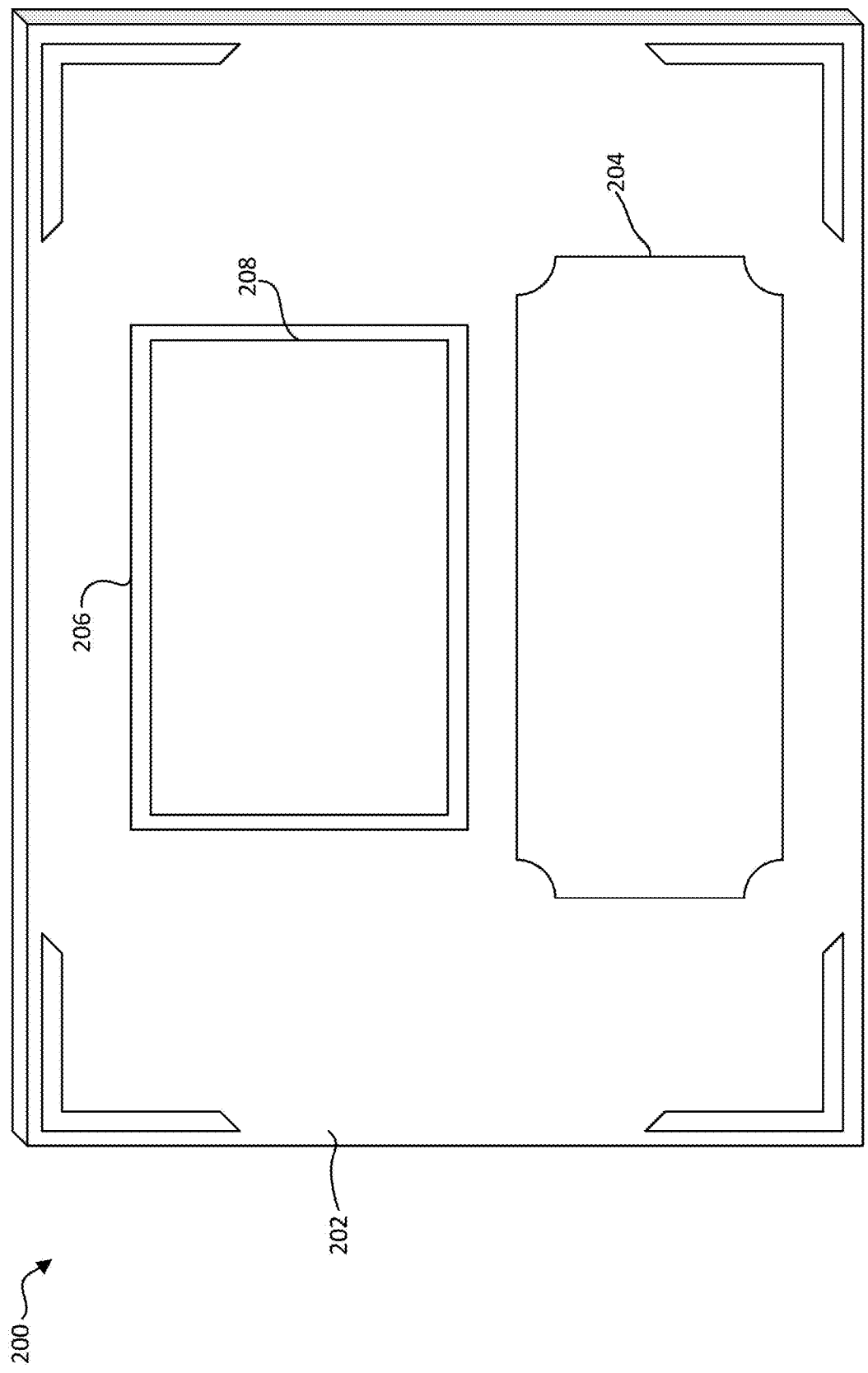
FIG. 5 illustrates an example plaque according to some embodiments.

As mentioned briefly above, the systems and methods described herein are not limited to trophies. FIG. 5 illustrates an example plaque according to some embodiments. As shown in FIG. 5, a plaque 200 can include a base 202 which may be, for example, wood, plastic, metal, or another material. The plaque 200 can include a display assembly. A plate 204 can be mounted on a front surface of the plaque 200. The plate 204 may be used, for example, for engraving the recipient's name, the reason for the award, the event that gave rise to the award, and so forth. The plaque 200 can include a recess 206. The recess 206 can be configured to receive a display apparatus 208, which may be similar to or the same as the display apparatus 150. The plaque 200 can have additional pockets, recesses, and so forth for housing other electronics of a display assembly such as a processor and memory, although in some cases the display screen and other components may be included in a single component that is placed in the recess 206. The display apparatus 208 may be recessed with respect to the front surface of the plaque 200, flush with the front surface of the plaque 200, or may protrude from the front surface of the plaque 200.

The awards depicted herein may be powered by batteries, an external power supply, and so forth. In some embodiments, solar panels or other hardware may be included for powering the award.

In some embodiments, an award (e.g., a trophy, plaque, etc.) can have a unique identifier assigned thereto. The unique identifier may be used for communication over a network (for example a wired or wireless network). The unique identifier can act as an address that enables a host or manufacturer to keep track of and/or identify a particular trophy 100 for various reasons as described in more detail below. The host or manufacturer may operate a website or other server that is accessible via a network such as the internet through an IP address, domain name, Uniform Resource Locator (URL), and so forth. In some embodiments, the host or manufacturer can be the manufacturer of the trophy 100. However, in some embodiments, the host or manufacturer can be any third party, such as a sports league, reseller of trophies, sports team, sponsor, and so forth. The host or manufacturer can communicate with the trophy 100 to transmit content and data to the trophy manually and/or automatically, as described in more detail below. In some embodiments, the unique identifier may be a MAC address, a serial number, or other identifier.

In some embodiments, a website may require a recipient to enter a password or other credential in order to access its content so that only the recipient of the trophy 100 can access the content on the website, which may include, for example, audio, images, and/or video of the recipient, other team members, etc. Thus, the recipient of the trophy 100 can be provided with a username and password (or other information sufficient for creating or accessing an account) that can be used for accessing the content on the website. In some embodiments, a recipient may be able to create an account by providing the unique identifier of the trophy. In some embodiments, a recipient may be able to create an account by providing the unique identifier and other identifying information (e.g., the event for which the trophy was awarded), which may help to ensure that only the true recipient can register. In some embodiments, a recipient may create an account using a personal device such as a desktop, laptop, or smartphone. In some embodiments, a recipient may create an account using the award itself. In some embodiments, portions of the website can be available to the public while other portions can be made available only to trophy recipients. In some embodiments, a username/password or other identifying credential can be linked to a particular trophy and can correspond to a unique identifier assigned to the particular trophy. Some recipients may receive multiple trophies. Thus, in some embodiments, a user may have a single account and may have multiple trophies associated with said account. Upon signing into the website, for example by entering a username and password, the recipient can be permitted to access recipient-only content.

Figure 6:
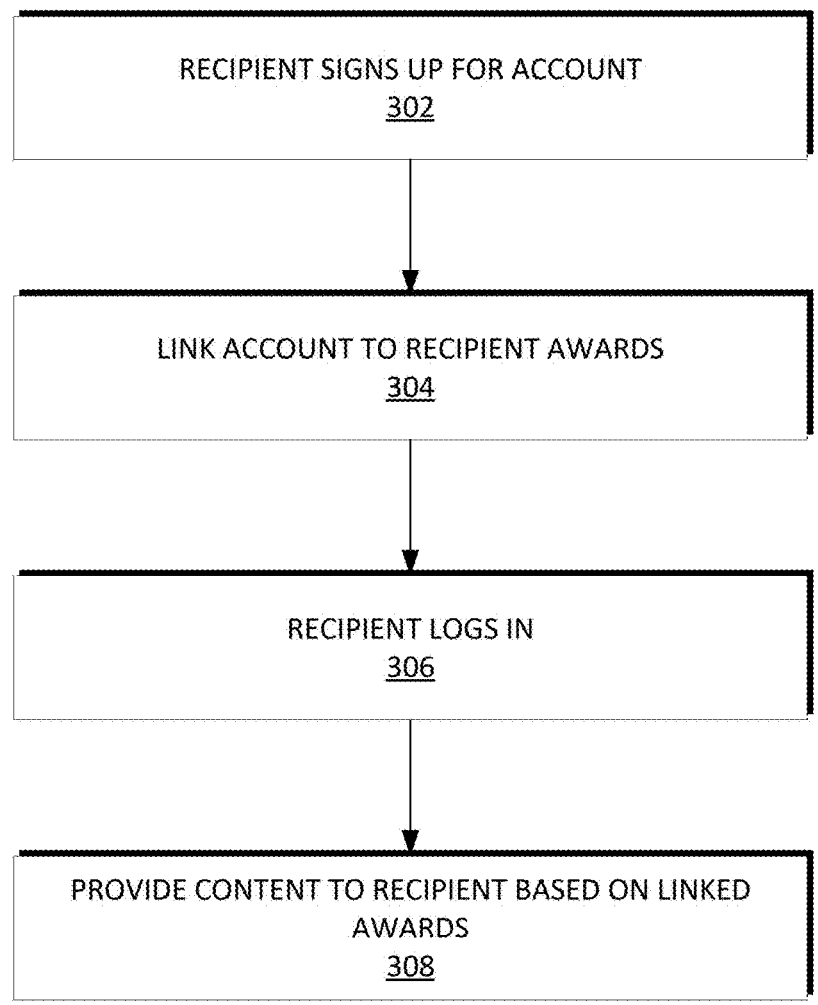
FIG. 6 is a flowchart that shows an example account creation and content access process according to some embodiments.

FIG. 6 is a flowchart that shows an example process according to some embodiments. Some embodiments may include more steps, fewer steps, and/or different steps than shown in FIG. 6. In some embodiments, steps may be performed in a different order. At 302, a recipient can sign up for an account on a platform, for example by accessing a website, application, etc., and providing registration information. In some embodiments, a recipient may need to provide a unique identifier for an award when creating an account, although in some embodiments, both recipients and non-recipients may create accounts. For example, non-recipients may be able to create accounts that give them access to areas of the platform that are not restricted to recipients. At 304, the platform can link the recipient's award or awards to the recipient's account. At 306, the recipient can log in to the platform. At 308, the platform can provide content to the recipient based at least in part on the awards that are linked to the recipient's account, which may include exclusive offers, videos, audio, photos, and so forth.

Figure 7:
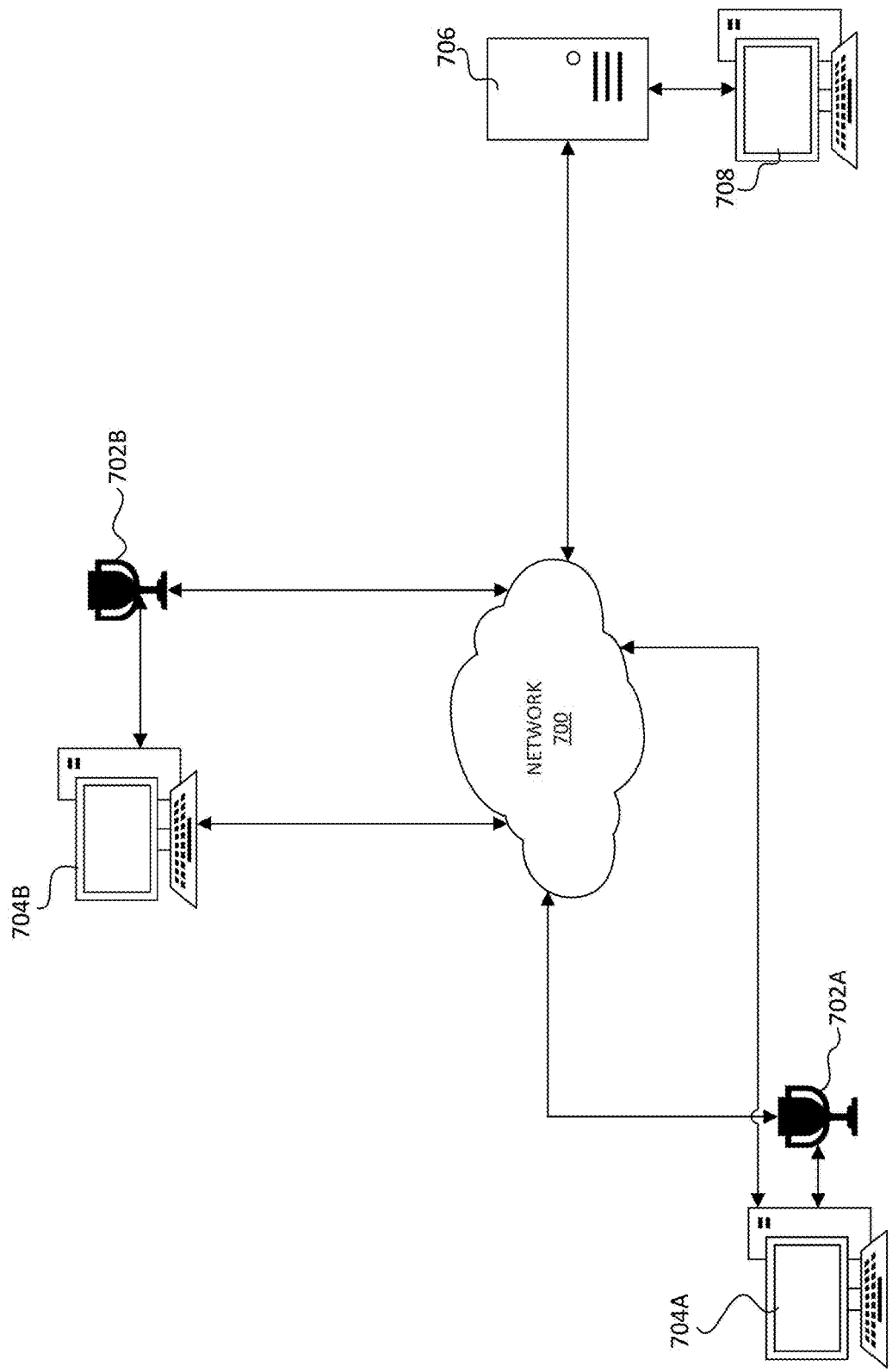
FIG. 7 is an example diagram that illustrates how awards can receive new information from a platform and/or from another device.

FIG. 7 is an example diagram that illustrates how awards can receive new information from a platform and/or from another device. FIG. 7 shows awards 702A and 702B, each of which can have its own unique identifier. In some embodiments, the awards 702A and 702B are in direct communication with a server 706 via the network 700. The server 706 can be a storage unit for any information that the host or manufacturer desires to provide to the recipients, such as the platform described above. The server 706 can be in communication with a computer 708. In some embodiments, the computer 708 can facilitate the transmission of content or data to the awards 702A and 702B via the server 706 and the network 700. In some embodiments, the awards 702A and 702B can be associated with computers 704A and 704B, respectively. In this embodiment, the recipient of the first award 702A can log onto the platform from the first computer 704A and access the platform on the server 706 via the network 700. The recipient can thereby be enabled to access the content on the website and, optionally, can transfer the content to the first award 702A. Similarly, the platform can be accessed from the second computer 704B and content can be transferred to the second award 702B.

In some embodiments, video containing highlights, interviews, and/or other recollections can be downloaded from the platform to enable a recipient to personalize their award and accentuate their achievement. That is, video can be available on the platform for download to the recipient's award. In some embodiments, video on the platform can be downloaded automatically when the recipient logs in. In some embodiments, a host can transmit data to a particular award by providing the data and the unique identifier of the award. Alternatively or additionally, data can be transmitted to an award via USB, WiFi, Bluetooth, etc., as discussed above.

In some embodiments, congratulatory messages can be loaded from prominent persons, such as coaches, dignitaries, and the like. In some embodiments, time-capsule information and/or video images can be downloaded to the memory of the award, thereby enabling the recipient to reflect on the events of the time of receiving the award months, years, or even decades after receiving the award. In some embodiments, information can be pre-loaded onto a platform (e.g., a website or app) so that when the recipient of an award registers on the platform, the pre-loaded information can be transmitted automatically to the recipient's award. In some embodiments, the pre-loaded information can be automatically shown on the display screen of the award. In some embodiments, the pre-loaded information can be sent directly to the award, while in other embodiments, the information can be sent to a recipient's computer or other device and then transferred therefrom to the award.

As noted above, once a recipient logs onto the website, the recipient can access a recipient-only page that enables the recipient to access content and services that are not available to non-recipients. Once logged on, the recipient and the recipient's award, via the award's unique identifier, can be automatically registered and placed into a database of award recipients. In some embodiments, registration information can be collected from the recipient such as email address, date of birth, and/or other contact, biographic, and/or demographic information. In some embodiments, a parent or legal guardian may create an account on behalf of a recipient. In some embodiments, recipients from the same team, tournament, event, and so forth can be entered into a unique forum for that group, and only members of that group who are recipients of one of the awards will be able to enter into the forum. In some embodiments, a moderator or other administrators may also have access to the forum.

In some embodiments, a recipient may be able to update previously-entered information so that as the recipient moves geographic locations, changes email addresses, etc., the information can be updated to remain current. The recipient may be prompted to update or verify their contact information from time to time, such as yearly or bi-yearly. Thus, in some embodiments, the platform can enable recipients to stay in contact with other recipients long into the future. The platform can include other specialized forums, such as an MVP Club, where all MVP award recipients, regardless of the tournament, event, location, time received, and so forth can be granted access to an exclusive forum with unique privileges.

As one specific example, there can be a ten-team soccer tournament called ABC Tournament. Each member of the winning team of ABC Tournament may receive a trophy (e.g., the trophy 100). Upon registering on the website, each member of the winning team can be granted access to a forum specific to that team so that the members of the team can stay in contact. The forum can be automatically created and each member of the winning team that receives a trophy can be automatically granted access to the forum upon registration. Thus, the forum can act as a social networking site for trophy recipients only that will enable members of the team to be able to locate teammates regardless of the passage of time or a change of address. Furthermore, each member of the team can download video highlights from the website and other content (which may be video, images, audio, etc.) to their trophy 100.

In some embodiments, recipients can upload video content, photos, audio, etc., to the website so that it can be accessed by other recipients who are members of the same forum. Thus, for example, if recipient A has a video of recipient B scoring a game-winning goal, that content can be shared via the platform so that recipient B can download that content to their own award and/or for viewing on another device such as a desktop, laptop, smartphone, and the like.

Continuing with the ABC Tournament example, additionally or alternatively, in some embodiments, each of the teams in the ABC Tournament can select an MVP for their team. Similar to the description above, each MVP can be automatically entered into an exclusive forum upon registration on the platform. The MVPs will thus be able to stay in touch with each other and/or get to know each other via the forum. These exclusive forums can be made available for a wide variety of categories including, for example, Most Improved, Most Home Runs, Most Spirited, and so forth. The unique identifier on each award can be used to enable a computer system to automatically determine which, if any, forums the recipient of the award should be granted access to. Thus, registration alone can be sufficient for the recipient to gain access to the appropriate forums.

In some embodiments, the host or manufacturer will be able to contact and transmit data to the display apparatus 150 of each trophy 100 individually and/or as a group. Thus, recipients can be notified of yearly anniversaries, reunions, and other team event information through automatic updates. For example, the coach of a team can arrange an end of season party or other event, such as a restaurant reservation, and can have the location, date, and time of the event pre-loaded onto each award prior to handing out the awards. Alternatively or additionally, information regarding the location, date, and time of the event can be preloaded onto a platform and automatically transmitted to each award once the recipient registers his or her unique award on the website. In another embodiment, updates may not be automatic. In some embodiments, data can be transmitted to the award upon a recipient conducting a manual update, for example through a USB, Wi-Fi, or Bluetooth connection. In some embodiments, updates regarding the geographic relocations of recipients can be transmitted to other recipients through their awards in order to enable teammates to keep in touch. In some embodiments, any event or other information that may be of use to a particular recipient can be transmitted to that recipient's award and displayed on the display screen.

In some embodiments, the recipients of the awards may be on a club team and may play on the same team together in multiple seasons (for example, every year). In some embodiments, information regarding practice times, cancellations, and so forth can be transmitted to the awards. As one example, if trophies are awarded at the end of Season 1, then some time later (e.g., a few months), content can be transmitted to each trophy and displayed on the display screens regarding the date, time, and/or other information about the first practice for Season 2. In some embodiments, the team's schedule can be transmitted and displayed on the display apparatus 150.

In some embodiments, reminders can be sent to recipients of awards. A reminder can be, for example, a reunion date, an anniversary date, a reservation date, a practice date, a game date, a season start date, a signup date, and so forth.

In some embodiments, the host, manufacturer, or another third party who is operating the platform may be able to utilize the unique commercial properties of the awards as described herein, for example by loading exclusive commercial opportunities, previews of television shows, animated series, movies, etc. In some embodiments, video coaching, where recipients can have a video memorial of the instructions they have learned, can be transmitted to the awards and displayed on the screens. In some embodiments, the host, manufacturer, or another third party can sell commercial advertising to outside companies. Thus, outside companies may be able to transmit advertising onto the display screens of the awards.

As just one example, Fictitious Soccer Company can purchase advertisement space on an award so that a commercial or advertisement will run on the display screen of the award. The advertisement can be configured to run once, each time the screen is viewed, periodically, a defined number of times, and so forth. In some embodiments, an advertiser (e.g., Fictitious Soccer Company) can target the awards of recipients who received awards due to participation and/or victory in a particular sport or other activity (for example, those who participated in a soccer league or tournament). In some embodiments, the advertiser can transmit the advertisement to all award recipients, or can otherwise segment the recipients for targeted advertising, for example by advertising to recipients who play particular sports, live in particular geographic areas, are particular age ranges, are of particular genders, and so forth.

In some embodiments, advertising space (or sponsored content space) can be sold to advertisers (e.g., Fictitious Soccer Company) on a periodic basis, e.g., on a weekly, monthly, quarterly, or yearly basis, or some other time period as desired. Thus, an advertiser may be able to provide new commercials or advertisements over time, to start and stop advertising as desired (for example, an equipment manufacturer may only advertise when a particular sport's season is upcoming or ongoing), etc. In some embodiments, advertisers can use the space for coupons, discounts, sales, and other purchasing opportunities which may be generally available or offered only to recipients of the awards.

As discussed briefly above, in some embodiments, an award can act as a projector. For example, the award can be configured to project images from the display screen (which may be a flat panel display or may comprise dedicated projector hardware) onto a solid surface to create a larger viewing area. In some embodiments, a video camera or other electronic device can communicate wirelessly with the award, for example via infrared, Wi-Fi, Bluetooth, ethernet, and so forth. In some embodiments, the communication hardware may be built into the award or may be an external component that interfaces with the award, for example via a wired or wireless connection, for example via a USB port.

In some cases, a platform may provide a website, mobile application, and so forth that recipients can use for consuming media content (e.g., video, photos, and so forth), accessing and participating in forums, and so forth. In some embodiments, advertisers and sponsors may be able to provide advertisements, coupons, sales announcements, exclusive opportunities, and so forth via the application or web site. In some embodiments, sponsors may send push notifications, in-app notifications, and so forth to recipients. In some embodiments, advertisers may send QR-codes, barcodes, and so forth to recipients for use in retail stores, may provide coupon codes for online use, and so forth.

As discussed above, in some embodiments, an award (e.g., a trophy or plaque) can include memory and processing hardware that enables the award to store, transmit, and/or otherwise process information. Thus, in some embodiments, the award can be configured to use wired and/or wireless connections to transfer information (e.g., photos or videos) for playback on another device such as a television.

The systems and methods described herein can, in some embodiments, reduce the financial burdens associated with providing trophies and other awards to those who participate in sports or other activities. In some cases, tournaments may desire to provide trophies as awards for winners in the tournament. However, the cost of trophies can often be a significant issue. Sponsors are often reluctant to purchase trophies for a tournament because, for example, they get only meager rewards such as signage, announcement and acknowledgement during games, placement on a tournament t-shirt, etc. Thus, in some cases, sponsors may feel that they get a poor return on their investment and may be reluctant to sponsor a tournament at all or may only be willing to pay a relatively small amount to sponsor a tournament. The disclosures herein can be used to enable a tournament to underwrite the costs of purchasing trophies for a tournament, camp, clinic, or other event. For example, tournament directors can sell the rights for commercialization in the trophy in the ways discussed above. For example, tournament directors can sell rights for a sponsor to put commercials onto the trophy, to present coupons, sales, discounts, etc. via the trophy display screen, and so forth. Thus, the sponsor's association and commercialization can last far beyond the date of the recipients receiving the trophies or other awards and can provide a more direct and/or aggressive means for the sponsor to reach their target market.

While some of the disclosure has been described with reference to trophies, the invention is not so limited. Unless clearly indicated otherwise either implicitly or explicitly, the systems and methods described herein can be used with a plaque or another award that is given to participants and/or victors in specific activities.

Computer Systems

Figure 8:
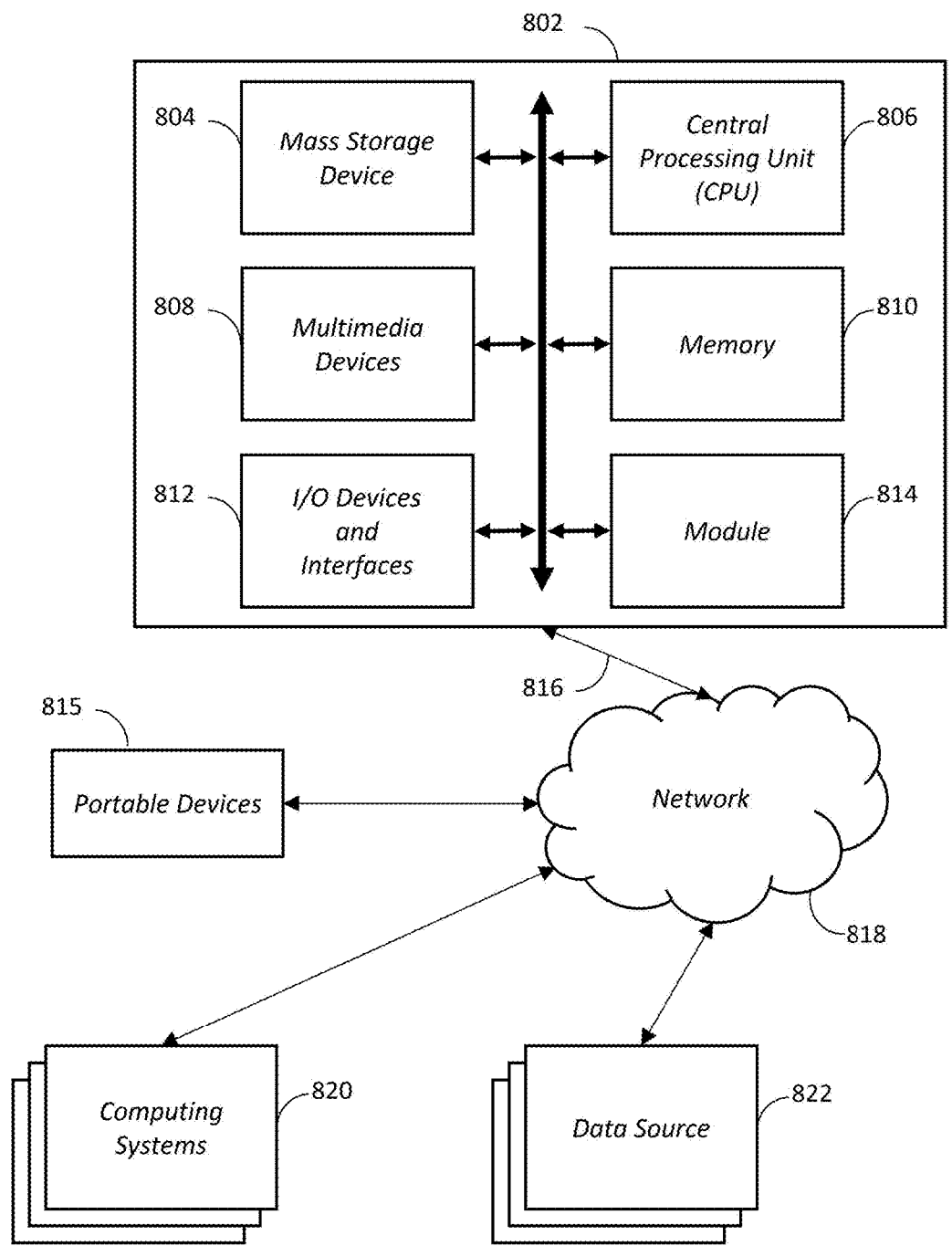
FIG. 8 is a block diagram depicting an embodiment of a computer hardware system configured to run software for implementing one or more embodiments disclosed herein.

FIG. 8 is a block diagram depicting an embodiment of a computer hardware system configured to run software for implementing one or more embodiments disclosed herein.

In some embodiments, the systems, processes, and methods described herein are implemented using a computing system, such as the one illustrated in FIG. 8. The example computer system 802 is in communication with one or more computing systems 820 and/or one or more data sources 822 via one or more networks 818. While FIG. 8 illustrates an embodiment of a computing system 802, it is recognized that the functionality provided for in the components and modules of computer system 802 may be combined into fewer components and modules, or further separated into additional components and modules.

The computer system 802 can comprise a module 814 that carries out the functions, methods, acts, and/or processes described herein. The module 814 is executed on the computer system 802 by a central processing unit 806 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 802 includes one or more processing units (CPU) 806, which may comprise a microprocessor. The computer system 802 further includes a physical memory 810, such as random-access memory (RAM) for temporary storage of information, a read only memory (ROM) for permanent storage of information, and a mass storage device 804, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 802 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 802 includes one or more input/output (I/O) devices and interfaces 812, such as a keyboard, mouse, touch pad, and printer. The I/O devices and interfaces 812 can include one or more display devices, such as a monitor, that allows the visual presentation of data to a user. More particularly, a display device provides for the presentation of GUIs as application software data, and multi-media presentations, for example. The I/O devices and interfaces 812 can also provide a communications interface to various external devices. The computer system 802 may comprise one or more multi-media devices 808, such as speakers, video cards, graphics accelerators, and microphones, for example.

The computer system 802 may run on a variety of computing devices, such as a server, a Windows server, a Structure Query Language server, a Unix Server, a personal computer, a laptop computer, and so forth. In other embodiments, the computer system 802 may run on a cluster computer system, a mainframe computer system and/or other computing system suitable for controlling and/or communicating with large databases, performing high volume transaction processing, and generating reports from large databases. The computing system 802 is generally controlled and coordinated by an operating system software, such as Windows XP, Windows Vista, Windows 7, Windows 8, Windows 10, Windows 11, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 802 illustrated in FIG. 8 is coupled to a network 818, such as a LAN, WAN, or the Internet via a communication link 816 (wired, wireless, or a combination thereof). Network 818 communicates with various computing devices and/or other electronic devices. Network 818 is communicating with one or more computing systems 820 and one or more data sources 822. The module 814 may access or may be accessed by computing systems 820 and/or data sources 822 through a web-enabled user access point. Connections may be a direct physical connection, a virtual connection, and other connection type. The web-enabled user access point may comprise a browser module that uses text, graphics, audio, video, and other media to present data and to allow interaction with data via the network 818.

Access to the module 814 of the computer system 802 by computing systems 820 and/or by data sources 822 may be through a web-enabled user access point such as the computing systems' 820 or data source's 822 personal computer, cellular phone, smartphone, laptop, tablet computer, e-reader device, audio player, or another device capable of connecting to the network 818. Such a device may have a browser module that is implemented as a module that uses text, graphics, audio, video, and other media to present data and to allow interaction with data via the network 818.

The output module may be implemented as a combination of an all-points addressable display such as a cathode ray tube (CRT), a liquid crystal display (LCD), a plasma display, or other types and/or combinations of displays. The output module may be implemented to communicate with input devices 812 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 802 may comprise a physical or logical connection established between a remote microprocessor and a mainframe host computer for the express purpose of uploading, downloading, or viewing interactive data and databases online in real time. The remote microprocessor may be operated by an entity operating the computer system 802, including the client server systems or the main server system, an/or may be operated by one or more of the data sources 822 and/or one or more of the computing systems 820. In some embodiments, terminal emulation software may be used on the microprocessor for participating in the micro-mainframe link.

In some embodiments, computing systems 820 who are internal to an entity operating the computer system 802 may access the module 814 internally as an application or process run by the CPU 806.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 802 may include one or more internal and/or external data sources (for example, data sources 822). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Cache), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MongoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, Amazon Timestream, or Amazon QLDB), a non-relational database, or a record-based database.

The computer system 802 may also access one or more databases 822. The databases 822 may be stored in a database or data repository. The computer system 802 may access the one or more databases 822 through a network 818 or may directly access the database or data repository through I/O devices and interfaces 812. The data repository storing the one or more databases 822 may reside within the computer system 802.

Additional Embodiments

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

What is claimed is:

1. An award comprising:
    a trophy comprising:
        a base capable of resting on a horizontal surface, the base having a front surface;
        a figurine coupled to the base, wherein the figurine is representative of an activity associated with the award; and
        a display assembly comprising:
        a display apparatus positioned on the front surface of the base;
        a non-transitory computer-readable medium with instructions encoded thereon; and
        one or more processors configured to execute the instructions to cause the display assembly to display on the display apparatus, to a recipient of the award, information comprising at least one of video highlights, interviews, photographs, and event information associated with an account of the recipient, wherein the account is also associated with a unique identifier of the award;
        wherein the one or more processors are configured to execute the instructions to cause the award to connect with an additional award to enable interconnectivity between the award and the additional award.

2. The award of claim 1, wherein the display apparatus comprises a flat panel display.

3. The award of claim 1, further comprising a communications interface.

4. The award of claim 3, wherein the communications interface is one or more of a Bluetooth interface, a Wi-Fi interface, a wired network interface, a USB interface, and an infrared interface.

5. The award of claim 3, wherein the instructions, when executed by the one or more processors, further cause the award to:
    receive, from a central server via the communications interface, media content; and
    display, via the display apparatus, media content to the recipient.

6. The award of claim 3, wherein the instructions, when executed by the one or more processors, further cause the award to:
    transmit, to a central server via the communications interface, a unique identifier of the award;
    receive, from a central server based at least in part on the unique identifier, an advertisement; and
    display, via the display apparatus, the advertisement.

7. The award of claim 3, wherein the instructions, when executed by the one or more processors, further cause the award to:
    receive, from a central server via the communications interface, a reminder of an upcoming date, wherein the upcoming date is one or more of a reunion date, an anniversary date, a reservation date, a practice date, a game date, a season start date, and a signup date.

8. The award of claim 3, wherein the instructions, when executed by the one or more processors, further cause the award to:
    transmit, to a server via the communications interface, an identifier of the recipient of the award;
    receive, from the server, information indicative of digital currency; and
    store, in a digital wallet, the information indicative of the digital currency.

9. The award of claim 8, wherein the digital currency is a cryptocurrency.

10. The award of claim 8, wherein the instructions further cause the award to:
    transmit, to the server, a public key associated with a digital wallet,
    wherein the received information indicative of digital currency is encrypted by the server using the public key.

11. The award of claim 3, wherein the award is configured to receive, via the communications interface from a computing device of the recipient, media content,
    wherein the media content is one or more of audio, video, and photos, and
    wherein the computing device of the recipient is one or more of a desktop computer, laptop computer, and smartphone.

12. The award of claim 1, wherein the figurine is coupled to the base by a riser that extends between the base and the figurine.

13. The award of claim 1, wherein the interconnectivity comprises synchronization of the display apparatus of the award and a display apparatus of the additional award.

14. The award of claim 1, wherein the one or more processors are configured to execute the instructions to cause the award to receive and display a message intended for the recipient of the award.

15. The award of claim 14, wherein the recipient is a member of a team, and wherein each member of the team receives an award, and wherein the message is intended for each member of the team.

16. The award of claim 1, wherein the figurine is coupled to the base by a riser coupled to a column, wherein the riser extends between the column and the figurine, and the column extends in between the riser and the base.

17. The award of claim 1, wherein the one or more processors are configured to execute instructions to cause the award to be upgradable based on user interaction with the award.

18. The award of claim 17, wherein the upgrades can comprise at least one of color changes, display changes, content changes, receipt of new offers, and additional privileges.

19. The award of claim 17, wherein the upgrades can be based on a point system.

\* \* \* \* \*